US008485552B2

(12) United States Patent
Karlsson et al.

(10) Patent No.: US 8,485,552 B2
(45) Date of Patent: Jul. 16, 2013

(54) CONNECTING ARRANGEMENT FOR AN AIRBAG MODULE

(75) Inventors: Henrik Karlsson, Mölndal (SE); Alexander Dramountanis, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 216 days.

(21) Appl. No.: 13/116,595

(22) Filed: May 26, 2011

(65) Prior Publication Data

US 2011/0291392 A1 Dec. 1, 2011

(30) Foreign Application Priority Data

May 31, 2010 (EP) .................................... 10164442

(51) Int. Cl.
*B60R 21/16* (2006.01)

(52) U.S. Cl.
USPC ........................................ 280/731; 200/61.55

(58) Field of Classification Search
USPC ........................................ 280/731; 200/61.55
See application file for complete search history.

(56) References Cited

U.S. PATENT DOCUMENTS 5,765,860 A * 6/1998 Osborn et al. ............ 280/728.2
6,135,494 A * 10/2000 Lotito et al. .................. 280/731
6,147,315 A 11/2000 Rudolph et al.
6,688,637 B2 * 2/2004 Igawa et al. ................ 280/728.2
6,719,323 B2 * 4/2004 Kai et al. ...................... 280/731
7,159,897 B2 * 1/2007 Worrell et al. ................ 280/731
7,671,288 B2 * 3/2010 Chung et al. ............... 200/61.54
7,694,997 B2 * 4/2010 Burghardt et al. ......... 280/728.2
7,891,699 B2 * 2/2011 Worrell et al. ............. 280/728.3
7,909,361 B2 * 3/2011 Oblizajek et al. ............. 280/731
8,398,115 B2 * 3/2013 Nebel et al. .................... 280/731
2001/0030412 A1 * 10/2001 Igawa et al. ................ 280/728.2
2007/0152428 A1 * 7/2007 Poli et al. .................. 280/728.2

FOREIGN PATENT DOCUMENTS

DE 19544631 A1 3/1997

OTHER PUBLICATIONS

Extended European Search Report for corresponding Application No. 10164442.5, mailed Nov. 8, 2010, 8 pages.

* cited by examiner

*Primary Examiner* — Toan To
(74) *Attorney, Agent, or Firm* — Brooks Kushman P.C.

(57) ABSTRACT

A connecting arrangement for connection of an airbag module to a steering column of a vehicle. The connecting arrangement having a first connector located on the airbag module and a second connector located on a component connected to the steering column. The first and second connectors having electrical contacts for the airbag module and/or electrical controllers located on a steering wheel of the vehicle. The first and second connectors being mutually formed such that they automatically connect as the airbag module is being connected to the steering column.

20 Claims, 5 Drawing Sheets

CONNECTING ARRANGEMENT FOR AN AIRBAG MODULE

CROSS-REFERENCE TO RELATED APPLICATIONS

This application claims foreign priority benefits under 35 U.S.C. §119(a)-(d) to EP 10164442.5, filed May 31, 2010, which is hereby incorporated by reference in its entirety.

TECHNICAL FIELD

The present invention relates to a connecting arrangement and method for connecting an airbag module to a steering column of a vehicle.

BACKGROUND

Modern vehicles are often provided with an expandable airbag enclosed in an airbag module in a hub of a steering wheel in order to protect a driver in the event of a frontal impact or collision. It is further common to provide an arrangement for activation of a horn signal in the hub. The driver may activate the horn signal by applying a pressure to the airbag module. The localization in the hub is convenient, since most drivers are used to that localization and will therefore instinctively reach for that localization in case of an emergency situation. It is consequently preferred that the airbag module can flex inwards to activate the horn signal.

However, the co-localization of the airbag module and the horn arrangement makes the mounting of a steering wheel assembly a complex operation involving many manual steps. Normally the steering wheel is mounted to a steering column before the airbag module can be attached to the steering wheel. A number of cables have to be pulled through the steering wheel to the airbag. These cables are manually connected, which may be difficult due to the small space available. It is also important that the anti-vibration properties of the steering wheel are not negatively influenced. Therefore an extra cover for guiding the cables is commonly used. The conventional design thus results in additional components, such as the guiding cover, and extra steps in the manufacturing process, both of which influence the manufacturing cost of the vehicle. Further, since the airbag module is mounted to the steering wheel after the steering wheel has been mounted to the steering column, it is not possible to prepare a kit with the steering wheel plus the airbag module as a unit on a separate production line. Moreover, there is also a risk that the cables are wrongly connected or that the connection of one or more cables is forgotten.

The document U.S. Pat. No. 6,147,315 discloses a steering wheel switch assembly with several individual switches and a support housing located inside the steering wheel for the accommodation of an airbag module, by means of which at least one horn switch can be activated. Inside the steering wheel there is a stationary support plate, which supports the support housing in a spring-biased, wobbling manner. The support housing has mounted on its side facing the support plate a contact unit with connector contacts. The unit has switch guides that contact individual switches by way of connecting lines and the horn switch is located on the connecting lines.

In order to keep the manufacturing costs down, there is a desire to use as few components as possible as well as to reduce the number of steps and their complexity in the manufacturing process. There is therefore a desire to find a less complex solution than the ones existing today, a solution allowing the co-localization of the airbag module and the horn arrangement in the steering wheel hub.

SUMMARY

One object of the present invention is to overcome or ameliorate at least one of the disadvantages of the prior art, or to provide a useful alternative.

The object above may be achieved by the invention to claim 1.

In a first aspect of the present invention there is provided a connecting arrangement for connection of an airbag module to a steering column of a vehicle. The connecting arrangement comprises a first connector located on the airbag module and a second connector located on a component connected to the steering column. The first and second connectors comprise electrical connectors for the airbag module and/or electrical controllers located on a steering wheel of the vehicle. At least one of the first and second connectors is mounted on its respective component so as to be resiliently displaceable with relation to its component at least along a first direction being essentially parallel to the steering column. The first and second connectors are mutually formed such that they automatically connect as the airbag module is being connected to the steering column.

Its respective component refers to the airbag module or the component connected to the steering column. An example of such a component connected to the steering column is a clockspring. The clockspring is a special rotary electrical connector allowing a steering wheel to be turned while still making an electrical connection between electronics of the steering wheel and/or of the airbag module and an electrical system of the vehicle.

The airbag module is connected to the steering column via the above-mentioned component connected to the steering column. In one embodiment, the airbag module is placed on the component connected to the steering column with the steering wheel in between the airbag module and the component.

Since the first and second connectors automatically connect as the connecting arrangement is connected, electrical contacts of the first and second connectors are automatically brought into contact with each other without any manual operation being needed. There is no need to visually survey the connection, so the connection may be made by blind mating.

In one embodiment, all or essentially all electrical connections between the steering wheel and/or the airbag module and the electrical system of the rest of the vehicle pass via the first and second connectors. Thereby loose cables needing manual connection of cable ends may be avoided. The extra cover used for guiding such cables may consequently be dispensed with, saving both cost and assembly work. Moreover, utilizing fewer or no cables may also improve the anti-vibration properties of the airbag module as compared to conventional solutions.

Since at least one of the first and second connectors is resiliently displaceable with relation to its component at least along a first direction being essentially parallel to the steering column, a horn arrangement may be provided allowing the user to activate a horn signal by applying pressure on the airbag module. As mentioned above, this way of activating the horn signal is convenient, since it is well known for most users. The resilient displaceability makes it possible for the airbag module to flex inwards to activate the horn signal.

The at least one of the first and second connectors may also be displaceable with relation to its component along other directions than the first direction, preferably resiliently displaceable. This could compensate for a user of the horn arrangement applying the pressure in another direction than the first direction. However, the first direction is the main displacement direction and any displacement in the other directions would be of a considerably smaller magnitude. Purely as an example, the displacement in the first direction may be between 0.1 and 20 mm, preferably between 1 and 15 mm and most preferably between 2 and 10 mm. If the displacement is in another direction than the first direction, the component of the displacement being in a direction perpendicular to the first direction may be less than a ⅕, preferably less than a 1⁄10, most preferably less than a 1⁄20 of the displacement in the first direction.

In one embodiment, the at least one of the first and second connectors comprises a connecting body and a housing. The housing is fixedly attachable to its respective component, and the connecting body is displaceable relative to the housing at least along the first direction, thereby being resiliently displaceable with relation to its component. In this case it is therefore the connecting body which provides the resilient displaceability.

The connecting body may be biased towards the external side of the housing by a biasing means. The biasing means may be a mechanical spring and/or a cushion made of an elastic material such as rubber.

In one embodiment, one of the first and second connectors comprises the connecting body and the housing and the other of the first and second connectors comprises a recess adapted to receive at least part of the connecting body when connecting the connecting arrangement. This configuration facilitates the connection of the first and second connectors to each other.

At least one of the first and second connectors may comprise a locking means, which is adapted to be pushed out of the way during connection of the first and second connectors and to secure the attachment of the first and second connectors in a connected state of the connecting arrangement. Once they are properly connected, the locking means will secure the attachment of the first and second connector to each other, such that they do not unintentionally disconnect. If, for some reason, there is a need to dismount the connection, e.g. for repair or maintenance of the steering wheel or airbag module, it may be done by, e.g. applying a considerably higher force than the one needed for connection or by moving the locking means out of the way.

The first and second connectors may have shapes, such that they only fit into each other when they are correctly oriented relative to each other. In that way it is ensured that they are correctly attached. In the case that the connector has a rectangular or square outer shape, as seen along the first direction being essentially parallel to the steering column, this may be attained by rounding or cutting off a corner of the rectangular or square outer shape. The shapes of the first and second connectors are suitably mirror images of each other, e.g. by letting an outer circumference of one connector fit into an inner circumference of the other.

Especially in the above-mentioned embodiment comprising the connecting body and the corresponding receiving recess, the inner circumference of the recess substantially coincides with the outer circumference of the connecting body. Some gap in between the connecting body and the corresponding receiving recess facilitates the relative movement to each other during connection and provides the resilient displaceability. Moreover, the gap can also be used for compensating for improper alignment at the beginning of the connecting operation.

The first connector may comprise at least one short-circuit plate adapted to short-circuit electrical contacts connected to the airbag module in an unconnected state of the connecting arrangement, and being separated from the electrical contacts in the connected state of the connecting arrangement. The at least one short-circuit plate ensures that the airbag is not unintentionally deployed by for example static electricity during manufacturing, storing or transport of the airbag module. When the first and second connectors are being connected to each other, the short-circuit plates are separated from the electrical contacts and the airbag will thereafter function in a normal way, i.e., being deployed in order to protect the driver in the event of a frontal impact or collision.

In the case that the at least one of the first and second connectors comprises a connecting body, an external edge of the connecting body may be chamfered, thereby facilitating alignment of the first and second connectors. If needed, this may compensate for improper alignment of the first and second connectors at the beginning of the connecting operation. The external edge is the edge being most distal from the component whereto the connector is attached. The external edge is typically essentially perpendicular to the first direction, which is essentially parallel to the steering column.

Further, at least one of the first and second connectors may comprise at least one biasing pin adapted to force the electrical contacts of the first and second connectors into contact with each other in the connected state of the connecting arrangement. The biasing pin itself may also be utilized as an electrical contact. The biasing pin may be resilient, e.g. in the form of a metallic spring, which provides both biasing means due to the spring configuration and electrical contact due to the metallic material.

In one embodiment comprising the above-mentioned connecting body and corresponding receiving recess, the at least one biasing pin is located on an external side of the connecting body. The biasing pin helps to force the electrical contacts of the connecting body against the electrical contacts in the wall of the recess, thus providing reliable electrical contact. A reliable electrical contact may be achieved even if the size of the recess is not perfectly adapted to that of the connecting body, thereby being able to compensate for possible production tolerances.

In one embodiment, wherein the connecting body has a rectangular shape, as seen along the first direction being essentially parallel to the steering column, the electrical contacts may be located at one or both long sides of the connecting body and locking means at one or both short sides.

In one aspect of the present invention, there is provided a kit comprising an airbag module and a first connector of the connecting arrangement described above. This kit may be produced on a separate production line, e.g. at a subcontractor, and be delivered to the main production line assembling the vehicles. The kit forms a unit which is easy to store and transport. Further, due to the connecting arrangement of the invention, the kit is easy and quick to assembly in the vehicle.

If the above-mentioned at least one short-circuit plate is comprised in the first connector, unintentional deployment of the airbag may be prevented.

It is also possible to provide a kit comprising the steering wheel, the airbag module and the first connector as a unit on a separate production line for delivery to the main production line assembling the vehicles. The conventional connecting arrangement used today requires the steering wheel to be mounted onto the steering column before the airbag module can be attached, but with a connecting arrangement according to the invention, the kit with the steering wheel, the airbag module and the first connector may be supplied as one unit to the main production line assembling the vehicles.

In one aspect of the present invention there is provided a kit comprising a clockspring and a second connector of the connecting arrangement as described above. Again, this kit may be produced on a separate production line, e.g. at a subcontractor, and be delivered to the main production line assembling the vehicles. Further, this kit also forms a unit which is easy to store and transport.

In one aspect of the present invention there is provided a vehicle comprising an airbag module, a steering column and an above-mentioned connecting arrangement, the airbag module being connected to the steering column by the connecting arrangement.

In one aspect of the present invention there is provided a method for connecting an airbag module to a steering column of a vehicle by means of a connecting arrangement comprising a first connector located on the airbag module and a second connector located on a component connected to the steering column. The first and second connectors comprise electrical connectors for the airbag module and/or electrical controllers located on a steering wheel of the vehicle. The method comprises the steps of:

placing the airbag module on top of the component connected to the steering column; and connecting the first and second connectors by applying a pressing force in a first direction being essentially parallel to the steering column, thereby connecting the first and second connectors.

Since the first and second connectors automatically connect when pressed together, contacts of the first and second connectors are automatically brought into contact with each other without any manual operation being needed. There is no need to visually survey the connection, so the connection may be made by blind mating.

Normally, the airbag module is placed on the component connected to the steering column with the steering wheel in between the airbag module and the component.

In one embodiment, all or essentially all electrical connections between the steering wheel and/or the airbag module and the electrical system of the rest of the vehicle pass via the first and second connectors. Thereby manual connection of cable ends may be omitted.

In one embodiment, the pressing force is applied when testing a horn arrangement of the vehicle, which horn arrangement is adapted to be activated by the pressing force. Since the horn arrangement is often anyway tested after mounting, this means that no extra working step is needed to make the connection of the connecting arrangement.

BRIEF DESCRIPTION OF THE DRAWINGS

The present invention will hereinafter be further explained by means of non-limiting examples with reference to the appended figures wherein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
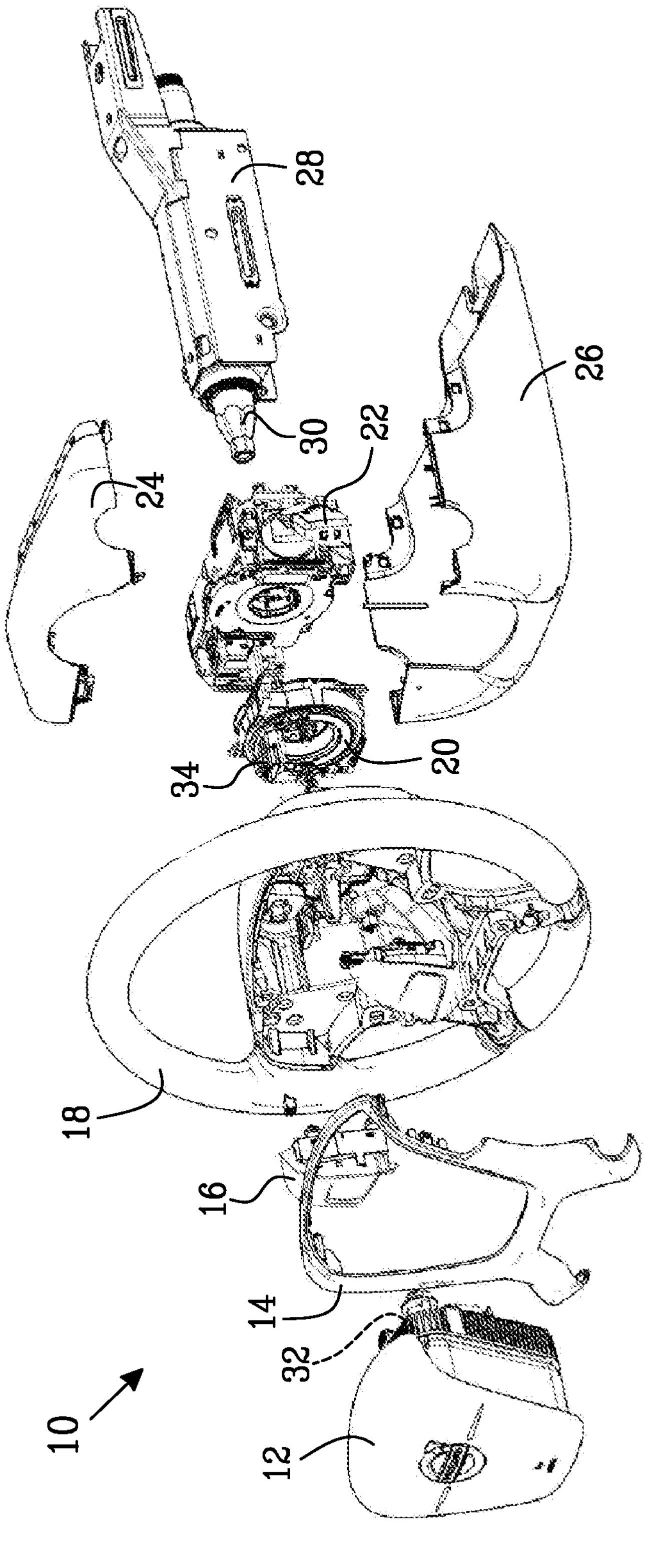
FIG. 1 is a schematic illustration of a steering wheel assembly comprising a connecting arrangement according to the invention.

FIG. 1 schematically illustrates a steering wheel assembly 10 comprising a connecting arrangement according to the invention in an exploded view. The steering wheel assembly 10 comprises an airbag module 12, a decorative insert 14, a switch pack 16, a steering wheel 18, a clockspring 20, a steering wheel module 22, an upper cover 24, a lower cover 26 and a steering column 28. The steering column 28 is connected to a steering mechanism of a vehicle. At one end of the steering column 28, there is a frustoconical steering pivot 30 to which the steering wheel 18 is attached, thereby allowing the steering wheel 18 to be turned around the steering pivot 30. The steering wheel module 22 is located around the upper end of the steering column 28 and on top of it the clockspring 20 can be seen. The clockspring 20 is a special rotary electrical connector allowing the steering wheel 18 to be turned while still making an electrical connection between electronics of the steering wheel 18 and/or of the airbag module 12 and an electrical system of the vehicle. The electronics of the steering wheel module 22 comprise connectors to the airbag and electrical controllers, such as controllers for an infotainment system and a cruise control. The steering column 28, the steering wheel module 22 and the clockspring 20 are at least partly covered by the upper cover 24 and the lower cover 26, which typically are made of plastic.

The connecting arrangement according to the invention comprises a first connector 32 located on the underside of the airbag module 12 and a second connector 34 located on a component connected to the steering column 28, in this example the clockspring 20. The connecting arrangement will be further described below in conjunction with FIGS. 2-6.

Figure 2:
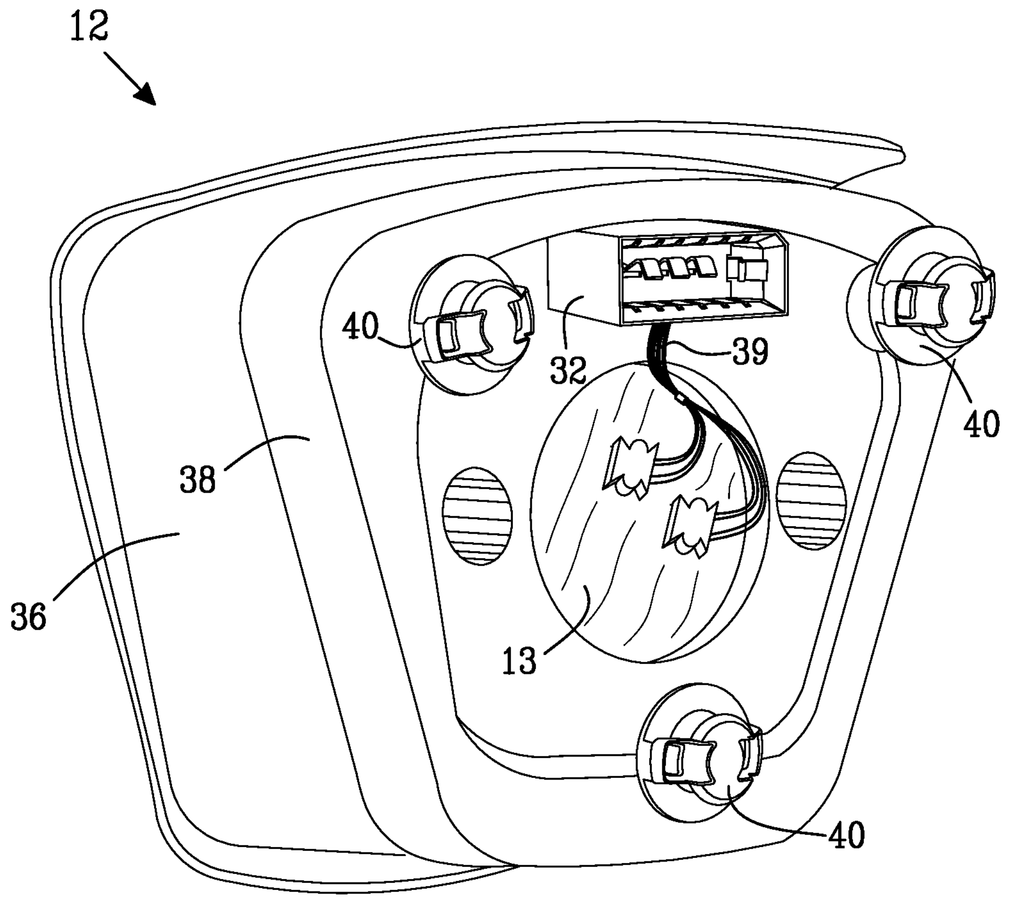
FIG. 2 illustrates an airbag module with a first connector of the steering wheel assembly of FIG. 1.

In FIG. 2 the airbag module 12 is seen from below. The airbag module 12 comprises the airbag 13, which may be deployed in order to protect the driver in the event of a frontal impact or collision. The first connector 32 is located on the underside of the airbag module 12 in a position corresponding to that of the second connector 34 on the clockspring 20. The housing of the airbag module 12 comprises two portions, an upper portion 36 and a lower portion 38, which for example may be manufactured of molded plastic. The upper portion 36 is seen by the vehicle occupant and is therefore normally made to provide an aesthetically pleasing visual appearance. The first connector 32 may be a separate part or may form a portion of the lower portion 38, in which case the first connector 32 and the lower portion 38 may be molded in one piece. Cables 39 connect a gas generator of the airbag 13 with the first connector 32.

According to the invention, fewer or no loosely hanging cables are utilized as compared to a conventional connecting arrangement, wherein loosely hanging cables are manually connected. With the connecting arrangement of the invention, the localization of the cables is predetermined, while the localization is more arbitrary in a conventional connecting arrangement. This is advantageous, since anti-vibration properties of the airbag module 12 thereby are improved, when running the vehicle in which the connecting arrangement is mounted.

The airbag module 12 comprises biasing feet 40, which here are spring-loaded but they may also be resilient in another way, for example by consisting of an elastic material such as rubber. In this exemplary embodiment there are three feet 40, but there may be fewer or more. The feet 40 bias the airbag module 12 in an initial position with an inactive horn arrangement for example by providing a gap between movable electrical horn contacts in the airbag module 12 and stationary horn contacts in the steering wheel 18. In order to produce a horn signal, the driver may apply a pressing force to the upper portion 36 of the airbag module 12, thereby displacing the airbag module 12 towards the clockspring 20. Such displacement activates the horn arrangement, for example by making electrical contact between the movable electrical horn contacts in the airbag module 12 and the stationary horn contacts in the steering wheel 18. When the pressing force is released, the feet 40 bias the airbag module 12 back to its initial position.

The connecting arrangement according to the invention facilitates this way of activating the horn signal since at least one of the connectors is mounted on its respective component so as to be resiliently displaceable with relation to its component, at least along a first direction being essentially parallel to the steering column 28. Thus, when the driver applies the pressing force to the airbag module 12, thereby displacing it, the connecting arrangement is able to follow the displacement movement by utilizing the resilient displaceability. In the described exemplary embodiment, the second connector 34 is resiliently displaceable as described below in conjunction with FIGS. 3 and 5. As an alternative, the first connector 32 or both connectors 32, 34 may be resiliently displaceable.

The illustrated embodiment is further configured such that, even if the driver applies the pressing force to the airbag module 12 at an oblique angle or at a non-central spot, the horn arrangement will anyway be activated. This is made possible since the illustrated connection allows slight movement in directions other than the above-mentioned first direction. However, the first direction is the main displacement direction and the other movements are of a considerably smaller magnitude.

Figure 3:
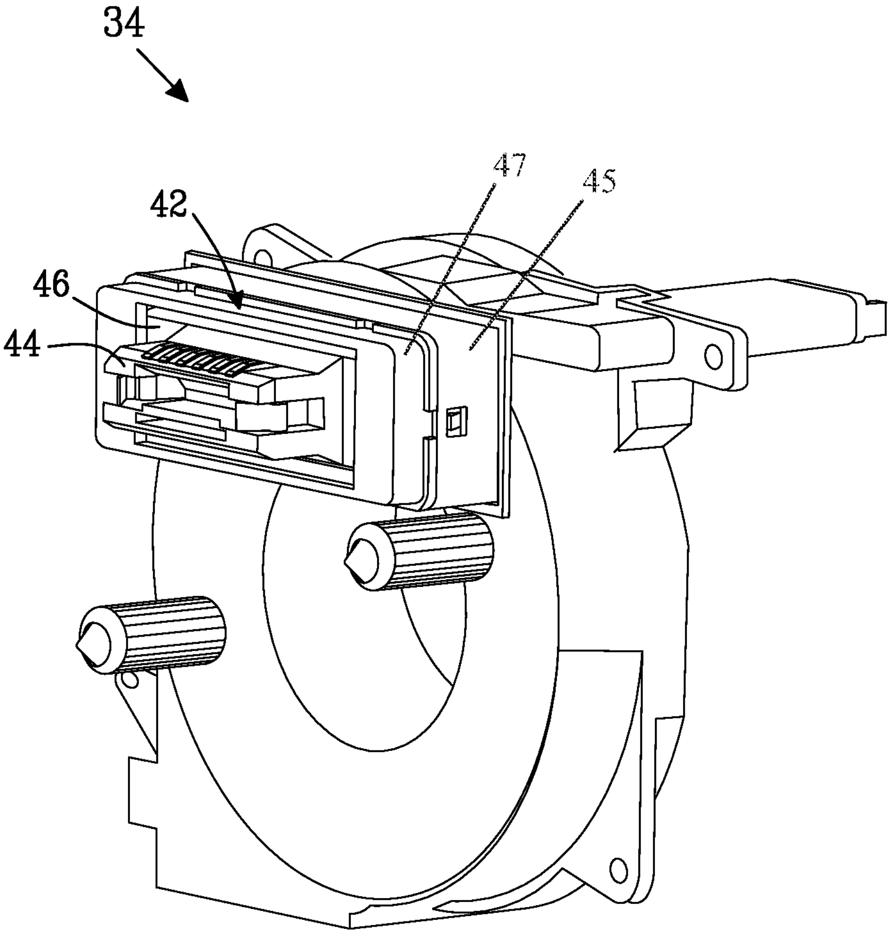
FIG. 3 illustrates a clockspring with a second connector of the steering wheel assembly of FIG. 1.

FIG. 3 shows a more detailed view of the clockspring 20. The second connector 34 is located on the clockspring 20 such that it follows the movement of the steering wheel 18 when the steering wheel 18 is turned. The second connector 34 comprises a housing 42 and a connecting body 44. The housing 42 is fixedly attached to the clockspring 20. The housing 42 or parts of it may be manufactured in one piece together with the clockspring 20 or parts of the clockspring 20, e.g. by plastic molding. The housing 42 has an opening 46 through which the connecting body 44 extends. The connecting body 44 is displaceable relative to the housing 42 in the first direction and can move up and down through the opening. Preferably, the connecting body 44 is biased by a biasing means (not seen) towards the opening 46, which is one way of achieving the above-mentioned resiliently displaceability. The biasing means may be a mechanical spring or may be a cushion made of an elastic material such as rubber.

The housing 42 may comprise separate parts, e.g. a lower part 45 being moulded in one piece with parts of the clockspring 20 and an upper part 47 comprising the opening 46. The second connector 34 may in that case be assembled by first placing the connecting body 44 in the lower part 45 and then placing the upper part 47 on top of the lower part 45, such that the connecting body 44 protrudes through the opening 46.

Figure 4:
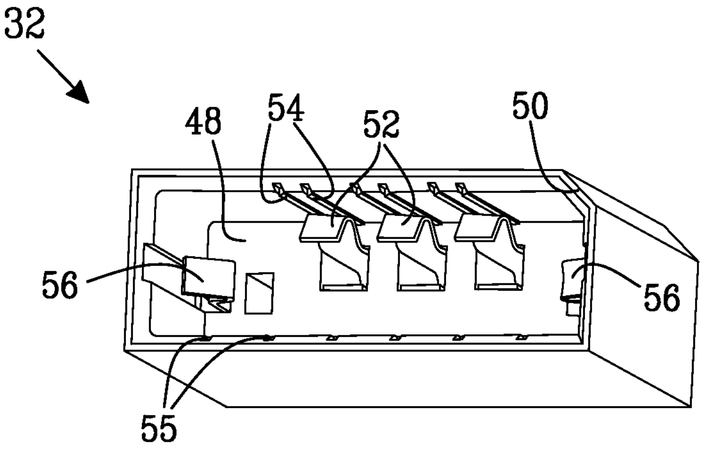
FIG. 4 illustrates a detailed view of the first connector of FIG. 2.

FIG. 4 illustrates the first connector 32 of FIG. 2. The first connector 32 has a recess 48 adapted to receive at least part of the connecting body 44 of the second connector 34. The recess 48 therefore has a corresponding shape to that of the connecting body 44. Further, the example illustrates an advantageous though not essential feature, namely that the shape is not symmetrical. Due to the illustrated cut-off corner 50, the connecting body 44 only fits into the recess 48 when both are correctly oriented relative to each other.

Further, the first connector 32 comprises three short-circuit plates 52. In an unconnected state of the airbag module 12, which is illustrated in FIG. 4, e.g. during manufacturing, transport and storage, the short-circuit plates 52 short-circuit electrical contacts 54 connected to the airbag module 12, ensuring that the airbag 13 is not unintentionally deployed. It is, for example, known that there is a risk of unintentionally deploying the airbag 13 due to static electricity, but with the proposed short-circuit plates 52 this problem may be avoided. As the first 32 and second connectors 34 are being connected to each other, the short-circuit plates 52 are separated from the electrical contacts 54 and the airbag 13 will thereafter function in a normal way, i.e. being deployed in order to protect the driver in the event of a frontal impact or collision. One, two, three or more short-circuit plates 52 may be used.

The first connector also comprises a number of electrical contacts 55 leading to the controllers for e.g. the infotainment system and the cruise control. In the exemplary embodiment, these are located at the opposite side of the recess 48 to the short-circuit plates 52. The electric contacts 54 leading to the airbag 13 may alternatively be located on the same side of the recess 48 as the electrical contacts 55 leading to the controllers, but the illustrated configuration is advantageous when utilizing short-circuit plates 52 adapted to short-circuit the electrical contacts 54 connected to the airbag module 12. Preferably, all electrical contacts pass through the connecting arrangement, such that there is no need for any manual connection of cables.

At the side walls of the recess 48 there are locking means in the form of first locking hooks 56. These match with corresponding locking means on the connecting body 44 of the second connector 34, here corresponding second locking hooks 66. (See FIG. 5.) The first and second locking hooks 56, 66 are easily pushed to the side when connecting the first 32 and second connector 34, making them easy to connect. However, once they are properly connected, the locking hooks 56, 66 will ensure the attachment of the first 32 and second connector 34 to each other, such that they do not unintentionally disconnect. If, for some reason, there is a need to dismount the steering wheel assembly 10, e.g. for repair or maintenance, the first 56 and/or second 66 locking hooks can be moved to a side, allowing disconnection of the first 32 and second connector 34. Alternatively, the first 32 and second connector 34 may be pulled apart. The force needed to pull them apart is, however, considerably higher than the force needed for connection of the connecting arrangement, thereby ensuring that unintentional disconnection is avoided.

The force needed to pull them apart may be selected by choosing appropriate shapes and materials for the locking hooks.

In the illustrated example, there are locking hooks 56, 66 both on the first connector 32 and the connecting body 44, but a similar locking function could be achieved by locking means in only one of the first 32 or second connectors 34. Locking means may also be located on the outer walls of the first connector 32. Other locking means, preferably with a snap-in function, may also be considered, such as a protrusion with a matching recess on the other part. It is preferred that the locking means automatically engages when the first 32 and second connector 34 are connected, without any additional manual working operation. The function of the locking hooks 56, 66 is explained below in conjunction with FIG. 6*a-c*.

Figure 5:
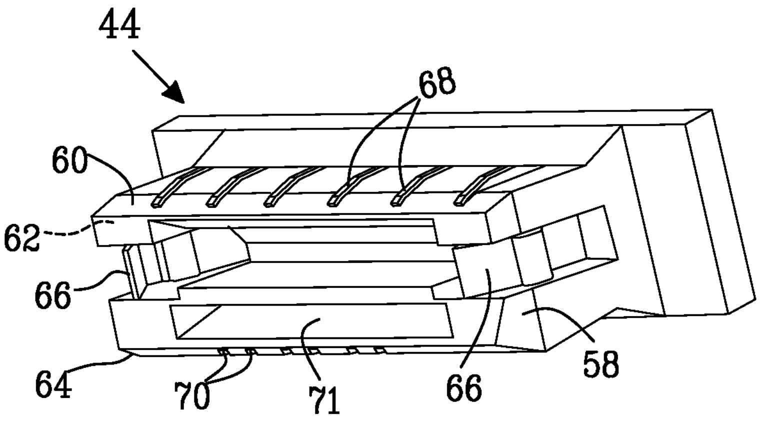
FIG. 5 illustrates a detailed view of the second connector of FIG. 3.

FIG. 5 illustrates the connecting body 44 of the second connector 34 of FIG. 3. As can be gleaned from FIG. 5, the external edges 58, 60, 62, 64 are chamfered, here by a bevelling. This facilitates alignment of the first 32 and second connector 34 during connection. They will thus fit onto each other, even if the first 32 and second connectors 34 are not perfectly aligned at the start of the connection operation. Moreover, the connecting body 44 comprises corresponding locking hooks 66 for engagement with the locking hooks 56 of the first connector 32.

The connecting body 44 further comprises biasing pins 68, 70 which are resilient. The biasing pins 68 at one external side of the connecting body 44 are used as electrical contacts for signals to the electrical controllers for e.g. the infotainment system and the cruise control. On the opposed external side, there are biasing pins 70 functioning as electrical contacts for signals to the airbag module 12.

In the connected state of the connecting arrangement, the biasing pins 68, 70 force the electrical contacts 68, 70 of the connecting body 44 into contact with the electrical contacts 54, 55 of the first connector 32, thereby ensuring a reliable electrical contact. The reliable electrical contact may be achieved even if the size of the recess 48 is not perfectly adapted to that of the connecting body 44, thereby compensating for possible production tolerances. The biasing pins 68, 70 may further also help to compensate for the first 32 and second connector 34 not being perfectly aligned at the start of the connection operation.

Even if the shown embodiment illustrates biasing pins 68, 70 at two opposed sides, it would be enough to only have at least one biasing pin at one external side of either the connecting body 44 or in the wall of the recess 48 to achieve the desired effect. The biasing pin may be used as a biasing means only, or may be used as a combined means for biasing and electrical contact.

A recess 71 in the connecting body 44 is shaped such that it can receive the above-mentioned short-circuit plates 52. Thereby the short-circuit plates 52 are separated from the electrical contacts 54 during connection of the connecting arrangement.

When the airbag module 12 is to be connected to the steering column 28 by means of the connecting arrangement, the following steps are performed:

placing the airbag module 12 on top of the component 20 connected to the steering column 28; and connecting the first 32 and second 34 connectors by applying a pressing force in a first direction being essentially parallel to the steering column 28, thereby connecting the first 32 and second connectors 34.

For a steering wheel assembly as disclosed in FIGS. 1-5, the airbag module 12 is placed on the clockspring 20 with the steering wheel 18 in between. Normally, the decorative insert 14 and the switch pack 16 have been mounted to the steering wheel 18 before it is mounted on the steering column 28. The first 32 and second connector 34 may pass through a corresponding opening in the steering wheel 18. The actual connection is achieved by applying a pressing force in the first direction being essentially parallel to the steering column 28. As described above, the connectors may be designed so as to be able to compensate for imperfect alignment.

Figure 6A:
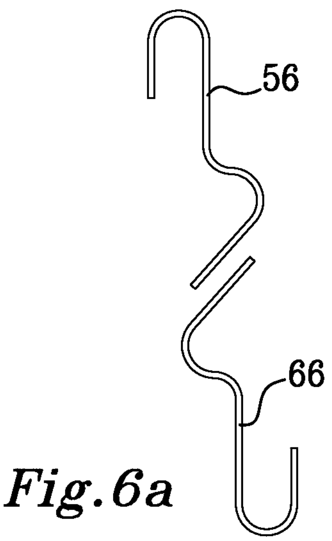
FIGS. 6*a*-6*c* illustrate how locking means of the first and second connectors interact with each other during connection.
Figure 6B:
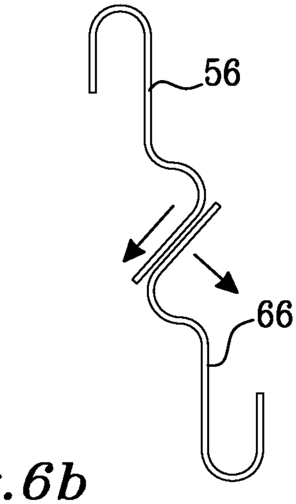
Figure 6C:
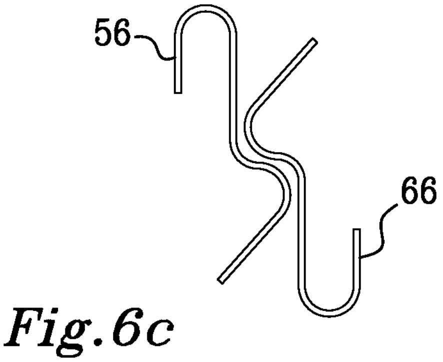

If locking hooks 56, 66 are provided, such as the ones mentioned above, these are automatically pushed aside during the connection and then snap back to a locking position, once the first 32 and second connector 34 are connected, such that the attachment is secured. FIGS. 6*a-c* illustrate how locking hooks 56, 66 of the first 32 and second 34 connectors interact with each other during connection. FIG. 6*a* shows the situation before connection. In FIG. 6*b*, illustrating the situation during the connection of the connecting arrangement, the two locking hooks 56, 66 interact with each other and push at least one of the locking hooks 56, 66 to the side, such that the connection movement may continue. In FIG. 6*c* the locking hooks 56, 66 have passed each other, such that they have reached a secured position preventing unintentional disconnection.

If short-circuit plates 52 are provided, such as the ones mentioned above, they are separated from the electrical contacts 54 of the first connector 32 during the connection and the airbag 13 will thereafter function in a normal way once the connection is done, i.e. being deployed in order to protect the driver in the event of a frontal impact or collision.

Preferably, the connection of the first 32 and second connector 34 is attained, when testing the horn arrangement of the vehicle during the mounting of the steering wheel assembly 10. Since the horn arrangement is anyway tested after mounting, this means that no extra working step is needed to make the connection of the connecting arrangement. The contacts of the first 32 and second connector 34 are automatically brought into contact with each other without any manual operation being needed. There is no need to visually survey the connection, so the connection may be made by blind mating.

In a conventional steering wheel assembly, the airbag module 12 is electrically connected to the clockspring 20 by means of manual connection of cables by an operator. The proposed invention omits this step.

Further modifications of the invention within the scope of the appended claims are feasible. As such, the present invention should not be considered as limited by the embodiments and figures described herein. Rather, the full scope of the invention should be determined by the appended claims, with reference to the description and drawings.

Even if the connecting arrangement herein is described in conjunction with a steering wheel airbag module it may also be used for connecting other airbag modules e.g. a front seat passenger airbag in the dashboard. The connecting arrangement may further also be used even if the steering wheel is not equipped with an airbag module. In that case it may be used for connecting electrical controllers located on the steering wheel. Moreover, similar connection arrangements may be used for other applications in which a resilient displaceability is desirable.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connecting arrangement for connection of an airbag module to a steering column of a vehicle, the airbag module having at least one compressible biasing member operable to active a horn, the connecting arrangement comprising:

a first connector adapted to be located on the airbag module and a second connector adapted to be located on a component connected to the steering column, the first and second connectors having electrical contacts for at least one of the airbag module and electrical controllers located on a steering wheel of the vehicle;

at least one of the first and second connectors being mountable so as to be resiliently displaceable at least along a first direction being essentially parallel to the steering column; and the first and second connectors being mutually formed to be automatically connectable as the airbag module is being connected to the steering column, the first and second connectors requiring compression of the at least one compressible biasing member in order to be automatically connected.

2. The connecting arrangement of claim 1 wherein the at least one of the first and second connectors comprises a connecting body and a housing, the housing being fixedly attachable to its respective component, and the connecting body being displaceable relative to the housing at least along the first direction.

3. The connecting arrangement according of claim 2 wherein the connecting body is biased towards the external side of the housing by a biasing means.

4. The connecting arrangement of claim 2 wherein one of the first and second connectors comprises the connecting body and the housing and the other of the first and second connectors comprises a recess adapted to receive at least part of the connecting body when connecting the connecting arrangement.

5. The connecting arrangement of claim 1 wherein the component connected to the steering column is a clockspring.

6. The connecting arrangement of claim 1 wherein at least one of the first and second connectors comprises a locking means, the locking means being adapted to be pushed out of the way during connection of the first and second connectors and to secure the attachment of the first and second connectors in a connected state of the connecting arrangement.

7. The connecting arrangement of claim 1 wherein the first and second connectors have shapes such that they only fit into each other when they are correctly oriented relative to each other.

8. The connecting arrangement of claim 2 wherein the shapes correspond with at least an external edge of the connecting body being chamfered to facilitate alignment of the first and second connectors.

9. The connecting arrangement of claim 1 wherein the first connector comprises at least one short-circuit plate adapted to short-circuit electrical contacts connected to the airbag module in an unconnected state of the connecting arrangement, and being separated from the electrical contacts in a connected state of the connecting arrangement.

10. The connecting arrangement of claim 9 wherein at least one of the first and second connectors comprises at least one biasing pin adapted to force the electrical contacts into contact with each other in the connected state of the connecting arrangement.

11. The connecting arrangement of claim 10 wherein the electrical contacts and the biasing pins are establish all electrical connections between the first and second connectors such that the first and second connectors are electrically connected without cables.

12. The connecting arrangement of claim 1 wherein the at least one biasing member decompresses to a deactivated position after being compressed to complete connection of the first and second connectors, the deactivated position preventing activation of the horn and the first and second connectors remaining electrically connected when the at least one biasing member is in the deactivated position.

13. A method for connecting an airbag module to a steering column of a vehicle by means of a connecting arrangement having a first connector located on the airbag module and a second connector located on a component connected to the steering column, the first and second connectors having electrical connectors for at least one of the airbag module and electrical controllers located on a steering wheel of the vehicle, the method comprising the steps of:

placing the airbag module on top of the component connected to the steering column; and connecting the first and second connectors by applying a pressing force in a first direction being essentially parallel to the steering column, wherein the pressing force is applied when testing a horn arrangement of the vehicle, the horn arrangement being adapted to be activated by the pressing force.

14. The method of claim 13 wherein the pressing force is sufficient to move the horn arrangement from a first position to a second position, the first position corresponding with compressible biasing members of the horn arrangement included on the airbag module being in an uncompressed state and a horn of the horn arrangement being in a deactivated state, the second position corresponding with compressible biasing members of the horn arrangement included on the being in a compressed state and the horn being in an activate state.

15. The method of claim 14 wherein biasing members include electrical contact that move from the first position to the second position when in contact with stationary horn contacts in the steering wheel.

16. The method of claim 14 wherein a displacement necessary to move the horn arrangement from the first position to the second position is between 2 and 10 mm when the pressing force is applied in a direction parallel to the steering column.

17. A connecting arrangement for connection of an airbag module to a steering column of a vehicle, the airbag module and steering column being mutually formed to be connectable when the airbag module is positioned in a first position such that the airbag module is retained within the steering column, the connecting arrangement comprising:

a first connector adapted to be located on the airbag module and a second connector adapted to be located on a component connected to the steering column, the first and second connectors having mating electrical contacts for electrically connecting the airbag module with the vehicle; and the first and second connectors being mutually formed to be connectable when the airbag module is positioned in a second position, the second position being forward of the first position.

18. The connecting arrangement of claim 17 wherein the second position corresponds with an activation position of a horn associated with a horn arrangement of the vehicle and wherein the first position corresponds with a deactivation position of a horn associated with a horn arrangement of the vehicle.

19. The connecting arrangement of claim 17 wherein the first position corresponds with a gap existing between electrical contacts of a biasing member included on the airbag module to activate a horn and the second position corresponds with the gap ceasing such that the electrical contacts contact.

20. The connecting arrangement of claim 17 wherein the airbag module must traverse a gap of between 0.1 and 20 mm to move from the first position to the second position.

* * * * *